United States Patent [19]

Cigolotti et al.

[11] Patent Number: 4,829,646

[45] Date of Patent: May 16, 1989

[54] METHOD FOR MOUNTING AN INJECTION PUMP ON AN INTERNAL COMBUSTION ENGINE

[75] Inventors: Jean-Pierre Cigolotti, Chassieu; Denis Devillierre; Jean Leblanc, both of Lyons, all of France; Reinhard Schwartz, Stuttgart, Fed. Rep. of Germany

[73] Assignee: Robert Bosch GmbH, Stuttgart, Fed. Rep. of Germany

[21] Appl. No.: 33,211

[22] PCT Filed: Jul. 18, 1986

[86] PCT No.: PCT/DE86/00294

§ 371 Date: Feb. 11, 1987

§ 102(e) Date: Feb. 11, 1987

[87] PCT Pub. No.: WO87/00582

PCT Pub. Date: Jan. 29, 1987

[30] Foreign Application Priority Data

Jul. 20, 1985 [DE] Fed. Rep. of Germany ....... 3525962

Jul. 5, 1986 [DE] Fed. Rep. of Germany ....... 3622633

[51] Int. Cl.[4] ............................................. B23P 15/00

[52] U.S. Cl. ................................ 29/156.4 R; 29/464; 29/525.1; 73/119 A; 123/495; 123/509; 417/63; 417/499

[58] Field of Search .............. 29/156.4 R, 464, 526 R; 73/119 A; 123/495, 509; 417/63, 499

[56] References Cited

U.S. PATENT DOCUMENTS 4,455,868 6/1984 Kampichler ...................... 73/119 A

*Primary Examiner*—Timothy V. Eley

*Assistant Examiner*—Frances Chin

*Attorney, Agent, or Firm*—Michael J. Striker

[57] ABSTRACT

A plug-in pump, which is controlled by a beveled edge, is inserted in a pump installation bore of the internal combustion engine with the aid of an adjusting arrangement and ensures a uniform feed quantity in all plug-in pumps of an engine without subsequent feed quantity adjustment. When the feed quantity adjusting element is fixed in the testing position, the plug-in pump, which is inserted in the test base, is rotated until the feed quantity corresponds to the desired feed quantity and a positioning peg of the adjusting arrangement, which is supported in the flange of the plug-in pump and received by a recess in the test base, is adjusted and fixed in this rotational position. When the control rod of the engine is blocked in the basic testing position, a positioning groove (33) of an adjusting plate (32) of the adjusting arrangement is put into a corresponding rotational position by means of a pump dummy.

11 Claims, 3 Drawing Sheets

METHOD FOR MOUNTING AN INJECTION PUMP ON AN INTERNAL COMBUSTION ENGINE

BACKGROUND OF THE INVENTION

The present invention relates to a method, for mounting an injection pump on an internal combustion engine and also to a multiple-cylinder and single cylinder internal combustion engine with plug-in pumps which are mounted in accordance with the method according to the invention.

Single-cylinder plug-in fuel injection pumps, called plug-in pumps for the sake of brevity, are always used to advantage when the expense for a single row or distributor injection pump in engines with low cylinder output (approximately 2 to 30 KW/cyl.) is too great and when the injection pumps are to be mounted as close as possible to the injection nozzle of the respective engine cylinder because of the use of shorter compression lines and the improved injection conditions which can be achieved accordingly. Plug-in pumps do not have their own drive, but are driven by a camshaft belonging to the engine. The injection rate is regulated by way of a control rod of the engine which, like the feed quantity adjusting element of the plug-in pump, lies beneath the respective fastening flange within the pump installation bore of the internal combustion engine.

Pumps of this constructional type are known, for example, from the firm Robert Bosch GmbH, Stuttgart, by the designation PF 1Q . . . and PFR 1K . . . (e.g., see the publication "Injection Equipment for Diesel Engines with PF Injection Pumps"; VDT-UBP 001/6 by Robert Bosch GmbH, Stuttgart), and before being mounted on the internal combustion engine each of these pumps is adjusted to a desired feed quantity, which is the same for all pumps of the same series, on a test bench accompanied by the use of a test base and is inserted and fastened in the respective pump installation bore of the internal combustion engine with the assistance of an adjusting arrangement. Since the adjusting arrangement,which is provided with a positioning peg, only fixes the aforementioned pumps in their mounting position at the pump installation bore, the engine must be accurately adjusted again on the test stand with respect to the feed quantities of the individual plug-in pumps in a very costly manner. In so doing, adjustable coupling parts of the control rod belonging to the engine must be coupled with and adjusted to the feed quantity adjusting elements of the plug-in pumps. This testing process must be performed again when replacing an individual pump.

A method of the type according to the generic part of the claim is known from EP-ES No. 0 090 226 which avoids the disadvantages referred to and which guarantees a feed rate which is the same for all plug-in pumps of an internal combustion engine when the plug-in pumps are installed in the internal combustion engine. Thus, for the first time, with desired feed quantities guaranteed by the injection pump manufacturer, this method ensures a uniform feed to all plug-in pumps in multiple-cylinder internal combustion engines, also without subsequent adjustment of the engine. The control rod belonging to the engine can be constructed as a simple stamped sheet metal part with fixed counter-coupling parts for the coupling parts of the feed quantity adjusting elements of the plug-in pumps and the internal combustion engine also no longer needs a viewing window for readjusting the control rod. Also, the engine need no longer be put on the test stand in order to adjust the required engine output, which is especially advantageous in an integrated drive, since, for instance, there is no longer any possibility of adjusting the engine with respect to its output along in a unit which is mounted in a fixed manner on the engine crankshaft. The substantial characteristic features of this method consist in that a first adjusting aid of an adjusting arrangement, e.g. a benchmark, is arranged at the fastening flange of the plug-in pump before the plug-in pump is mounted by means of an apparatus located on the test base and a second adjusting aid, e.g. also a benchmark, of the adjusting arrangement at the pump installation bore of the internal combustion engine is arranged in each instance in a position assigned to the basic testing position of the feed quantity adjusting element at the internal combustion engine by means of a pump dummy when the control rod belonging to the engine is blocked in the basic testing position. When the plug-in pump is inserted in the pump installation bore the two adjusting means are then made to overlap each other. The adjusting means used and indicated in the known method, e.g. benchmarks or hole and pin plug-in connections, are immovably fixed after being attached and can no longer be corrected. In the event of an unintentional faulty adjustment or in case of repairs to some structural component part, this leads to costly subsequent work or the necessity of exchanging important structural component parts.

SUMMARY OF THE INVENTION

The invention has the object of improving the known method for mounting the plug-in pumps and the respective adjusting arrangement, as well as the internal combustion engine, in such a way that the method is completely independent from the ability of the skilled workman mounting the plug-in pump and can also be carried out in a fully automatic manner by means of robots when the piece numbers call for this. Moreover, in the case of faulty adjustments or repairs, it is possible to apply the required adjusting means as often as desired without costly subsequent work by means of simple readjustment.

This and other objects of the invention are attained by a method of mounting a single-cylinder plug-in fuel injection pump on an internal combustion engine, wherein prior to mounting the plug-in pump, during the rotation of the plug-in pump which is effected for the purpose of adjusting the feed quantity, a positioning peg of an adjusting pin is held in said test base by means of a recess receiving said positioning peg, said adjusting pin being displaceably supported in said fastening flange, and said positioning peg serving as said first adjusting aid of said adjusting arrangement and being directed toward the flange surface at said pump installation bore and, after the feed quantity is adjusted, said adjusting pin is secured in the position then occupied by it; wherein a positioning groove in an adjusting plate arranged on said flange surface of said pump installation bore, which positioning groove serves as said second adjusting aid and is provided for receiving said positioning peg, is brought into the position assigned to the basic testing position of said feed quantity adjusting element by means of said pump dummy, which is inserted in said pump installation bore and, with a coupling part which is fixed in position, is introduced into a corresponding countercoupling part of the control rod belonging to the engine, and is fixed in this position by means of fastening said adjusting plate to said flange surface so as to be detachable; and wherein said feed quantity adjusting element is coupled with said control rod belonging to the engine when said plug-in pump is inserted in said pump installation bore and said positioning peg is inserted in said positioning groove of said adjusting plate. Both the positioning peg of the adjusting pin, which serves as the first adjusting means and is supported in the fastening flange so as to be adjustable, and the positioning groove in the adjusting plate arranged on the flange surface of the pump installation bore, which positioning groove is provided for receiving the positioning peg and serves the second adjusting means, are fully adjustable and can be secured in the position occupied by them after adjustment. When the plug-in pump is inserted in the pump installation bore the feed quantity adjusting element is coupled with the control rod belonging to the engine and the positioning peg is only inserted in the positioning groove of the adjusting plate. This mounting process is accordingly completely independent from the ability of the person mounting and, in the event of faulty adjustments or repairs, the necessary adjusting work can be repeated as often as desirfed without costly subsequent work by means of simple readjustment. When the adjusting pin carrying the positioning peg is constructed as an overhung crank with an eccentrically arranged positioning peg, then the adjusting pin can be used in an advantageous manner as an adjusting tool for turning the injection pump, so that the adjustment of the feed quantity to the plug-in pump is substantially simplified and made cheaper.

The adjusting plate may be inserted between the fastening flange and the flange surface of the pump installation bore as a support for the fastening flange of the plug-in pump and can accordingly serve simultaneously as a pre-stroke adjusting plate.

All pumps of the same series may project forward the same distance from the fastening flange until the outermost limit of the plug-in pump on the drive side and the same extent of projection is set at the pump installation bore of the internal combustion engine by means of selecting adjusting plates which are provided with a suitable thickness dimensioning, so that each plug-in pump of the same series can be inserted in any desired pump installation bore of the internal combustion engine without specially adapting the dimensioning which determines the pre-stroke. The pre-stroke determining the beginning of the feed is then safely ensured without fitting and adapting work and without carrying out costly checking work, and the adjusting plates serve at the same time as pre-stroke adjusting disks.

A respective multiple-cylinder internal combustion engine whose control rod, as known from the EP-PS No. 0 090 226 which was already cited, is constructed in one piece with the counter-coupling parts may be arranged in the cylinder spacing for the feed quantity adjusting elements of the plug-in pumps which are arranged in a row; and the adjusting arrangement which is formed in each instance by one of two the adjusting means, may be furnished for the mounting of the plug-in pumps.

The positioning peg forming the first adjusting aid may be arranged within a cut out portion which is offset relative to the support surface of the fastening flange and opens radially outward, and the adjusting plate may have the approximate form of a small U-shaped plate which projects into the cut out portion from the outside with a positioning groove forming the second adjusting aid and embraces the positioning peg on two sides and is fastened on the flange surface of the pump installation bore by means of a screw. Such a small adjusting plate is inexpensive and simple to produce and takes on no further functions, so that there are no special requirements with respect to the thickness tolerance or the surface evenness of this plate, as would be necessary if the adjusting plate simultaneously served as a pre-stroke adjusting disk.

The objects at this invention are also attainable with a single-cylinder internal combustion engine which is equipped with an adjusting arrangement formed by the two adjusting means for carrying out the method according to this invention.

In order to facilitate the mounting of the adjusting plate, the adjusting plate, which is shaped like a U-shaped plate, may be provided, with means for aligning the mounting position of the adjusting plate, in addition to the positioning groove and at least one through-opening for the fastening screw; and, this means may be formed by two recesses which are preferably arranged so as to be symmetrical relative to the positioning groove and in which the position securing pins of the pump dummy can then engage.

BRIEF DESCRIPTION OF THE DRAWINGS

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
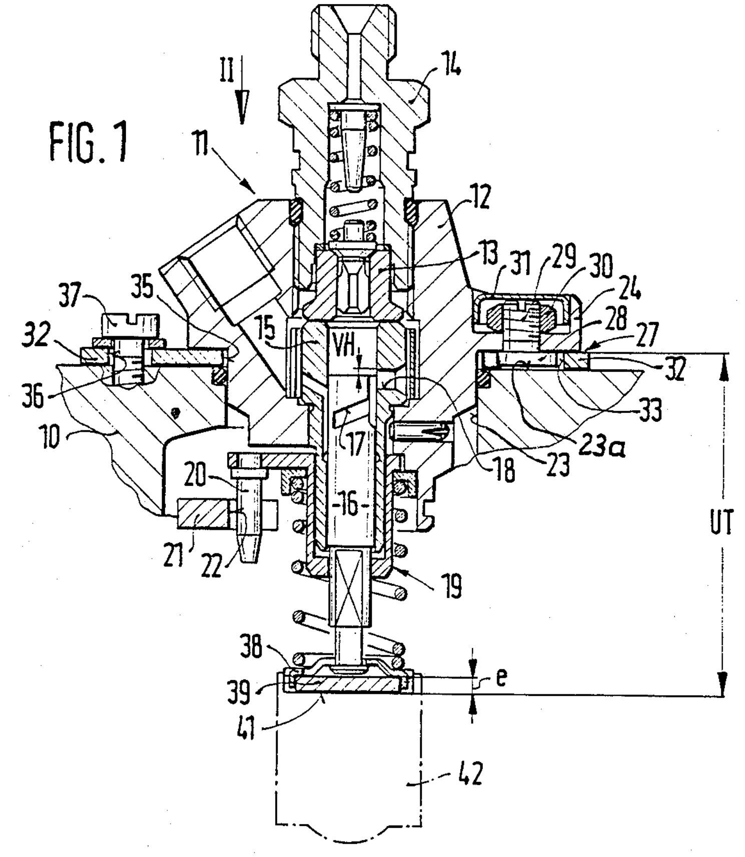
FIG. 1 shows the first embodiment with a plug-in pump which is constructed according to the invention and is mounted on the respective internal combustion engine.
Figure 2:
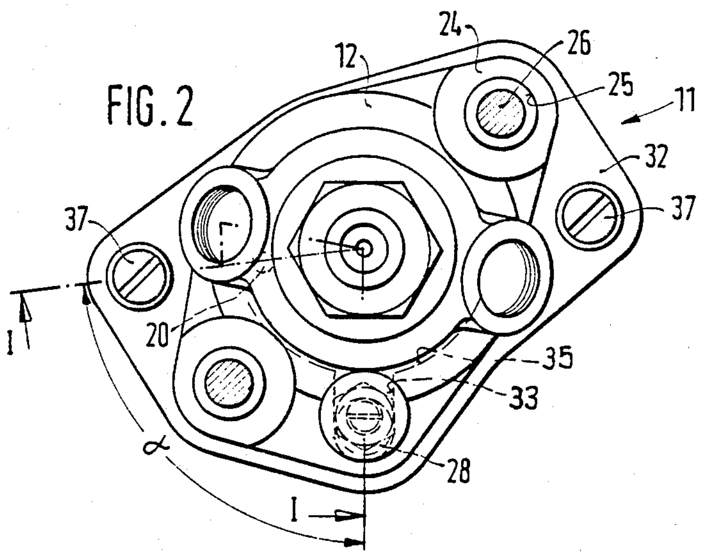
FIG. 2 shows a top view in the direction of arrow II in FIG. 1.
Figure 3:
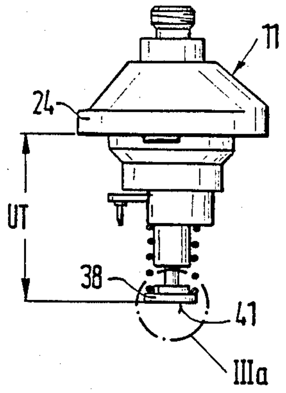
FIG. 3 shows the extent of projection UT required for the adjustment of the pre-stroke in simplified form.

A single-cylinder plug-in fuel injection pump 11, henceforth called plug-in pump for the sake of brevity, which is controlled by a beveled edge and is inserted in a housing 10 of the respective internal combustion engine is shown in FIGS. 1 and 2 in longitudinal section and a top view. Within a pump housing 12, a pump cylinder 15 is fastened in a pump housing 12 in a known manner with the intermediary of a pressure valve 13 by means of a screwed pipe 14. A pump piston 16 is guided within the pump cylinder 15 so as to be axially and rotatably movable and carries on its outer surface area a beveled control edge 17 which cooperates with a control borehole 18 in the wall of the pump cylinder 15 in order to determine the feed quantity. A control sleeve which forms a feed quantity adjusting element 19 is coupled with the pump piston 16 so as to be fixed against rotation relative to it, but permits its stroke movement and carries a driving pin 20 as a coupling part for actuation by means of a control rod 21 which belongs to the engine, the driving pin or coupling part 20 being fastened at a control arm and arranged parallel to the longitudinal axis of the pump piston. The coupling part 20 engages in a slotlike counter-coupling part 22 at the control rod 21 belonging to the engine. For use in a multiple-cylinder internal combustion engine, the control rod 21 belonging to the engine is constructed in one piece with the counter-coupling parts 22, which are arranged in the cylinder spacing so as to be fixed in position (not shown in more detail). The respective plug-in pumps 11 are then inserted, also in the same cylinder spacing, in a pump installation bore 23 of the housing 10 of the internal combustion engine and each pump installation bore 23 is provided on the mounting side with a flange surface 23a for attaching the plug-in pump 11.

The pump housing 12 of the plug-in pump 11 carries a radially projecting fastening flange 24 which contains two through boreholes 25 for fastening screws 26 in the embodiment shown (see FIG. 2). The through boreholes 25, which can also be formed as elongated holes, are large enough so that a partial rotation of the pump housing 12 for the basic setting of the feed rate is possible.

There is an adjusting arrangement 27, which is formed by two adjusting means, at the point of connection between the fastening flange 24 of the plug-in pump 11 and the flange surface 23a at the housing 10 for an accurately positioned installation of the plug-in pump 11. A positioning peg 28 of an adjusting pin 29 serves as a first adjusting aid and is supported in the fastening flange 24 so as to be adjustable with respect to rotation and projects forward on the drive side. This adjusting pin 29 is formed as the overhung crank with an eccentrically arranged positioning peg 28 and, in this construction, can be used simultaneously as an adjusting tool for the rotation of the plug-in pump. An adjusting pin with a con centrically arranged positioning peg is also conceivable which would then have to be fastened so as to be displaceable in the circumferential direction in an elongated hole of the fastening flange 24 (not shown). The installed position of the positioning peg 28 is secured by means of a fastening nut 30 and is sealed, in addition, by means of a cap 31. Of course, the adjusting pin 29 can also be secured against rotation by means of other securing means, such as calking.

An adjusting plate 32 is inserted between the fastening flange 24 of the plug-in pump 11 and the flange surface 23a on the internal combustion engine, which adjusting plate 32 embraces the positioning peg 28 on two sides with a positioning groove 33 which forms the second adjusting means (see also FIG. 7) and, in addition to through openings 34 for the fastening screws 26 of the plug-in pump 11 and a central opening 35 for receiving the pump housing 12, also comprises through openings 36 for screws 37 serving to fasten the adjusting plate 32. These through openings 34 and 36 in the adjusting plate 32 are also constructed so as to be large enough so that, like the through openings 25 in the fastening flange 24 of the plug-in pump, they permit the necessary partial rotatability of the adjusting plate 32 described above. Of course, these through openings 34 and 36 can also be formed as elongated holes.

A spring disk 38 is fastened at the base of the pump piston 16 and, in the embodiment according to FIG. 1, receives a pre-stroke plate 39 with the thickness e, the outer front face of plate 39 forms a limit 41 of the plug-in pump 11 on the drive side. A roller tappet 42, which is indicated in dash-and-dot lines, belongs to the cam drive 43 (see also FIG. 5) of the internal combustion engine in the described constructional type of plug-in pump 11, but can also be an integrated structural component part of the pump in another known constructional type of plug-in pump. By means of selecting the thickness dimensioning e of the pre-stroke plate 39 the extent of projection UT, which determines the pre-stroke VH of the pump piston and occupies the bottom dead center, is adjusting from the fastening flange 24 to the outermost limit 41 on the drive side. The pre-stroke VH is the portion of the pump piston stroke which is traveled from the front side of the pump piston 16 on the side of the pump working chamber until the closing of the control borehole 18.

FIGS. 3 to 7 serve to explain the method, according to the invention, for mounting the plug-in pumps 11 on an internal combustion engine and also contain the necessary arrangements.

Figure 3A:
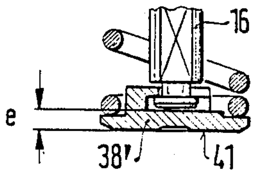
FIG. 3*a* shows a detail IIIa of FIG. 3 with an exchangeable spring disk for adjusting the pre-stroke.

FIG. 3 again shows the extent of projection UT extending from the fastening flange 24 to the limit 41 of the plug-in pump on the drive side; FIG. 3a shows a spring disk 38' in section, and on an enlarged scale as a modification of the spring disk 38, the spring disk 38' is arranged at the piston base of the pump piston 16, whose thickness dimensioning e likewise serves for the adjustment of the extent of projection UT, the limit 41 of the plug-in pump 11 on the drive side being formed by the front face of the piston base of the pump piston 16 on the drive side.

Figure 4:
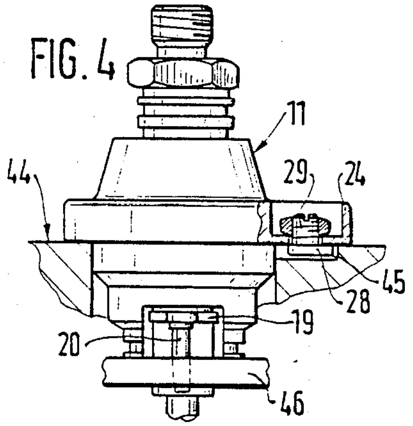
FIG. 4 shows the plug-in pump which is inserted in a test bse for adjusting the feed quantity by fixing the first positioning means.

FIG. 4 shows the plug-in pump 11 inserted in a test bse 44 for the feed quantity adjustment. The positioning peg 28 serving as the first adjusting means is received by a recess which is formed as a positioning groove and serves as a device for the application of the first positioning means, and the coupling part 20 of the feed quantity adjusting element 19 is held in the basic testing position (e.g. middle position), or in a testing position diverging from this basic testing position by a predetermined distance, by an adjusting rod 46 of the test base 44 corresponding to the control rod 21 of the engine. The angular position thus occupied between the coupling part 20 and the positioning peg 28 is equal to the angle shown in FIGS. 2 and 7 when the control rod 21 belonging to the engine is in the basic testing position.

Figure 5:
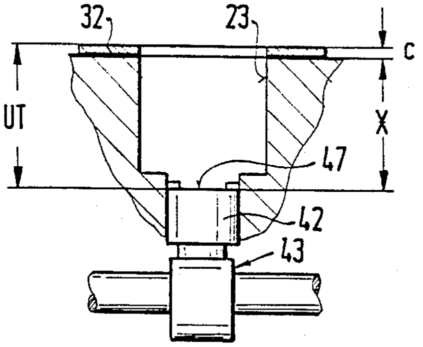
FIG. 5 shows a partial section illustrating the degree of depth on the adjustment internal combustion engine corresponding to the extent of projection UT.

FIG. 5 shows the dimensioning at the pump installation bore 23 of the internal combustion engine which are required for determining the pre-stroke at the plug-in pump. The extent of projection UT which is set at the plug-in pump 11 is adjusted at the internal combustion engine as a degree of depth, but is designated in the same manner. It comprises a distance X, extending from the flange surface of the pump installation bore 23 to a support surface 47 at the cam drive 43, and the thickness c of the adjusting plate 32, which is made available in different thickness dimensioning. In this case, the cam drive 43 also comprises the roller tappet 42 so that the support surface 47 is located at the roller tappet 42 of the cam drive 43. If a plug-in pump with integrated roller tappet were used the extent UT would reach the base circle of the respective drive cam, which would then form the support surface 47. The extent of projection UT is then produced at the plug-in pump by means of exchanging the rollers.

Figure 6:
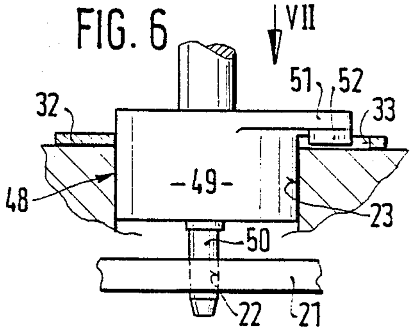
FIG. 6 shows the pump installation bore on the internal combustion engine with inserted pump dummy for adjusting the position of the adjusting plate.
Figure 7:
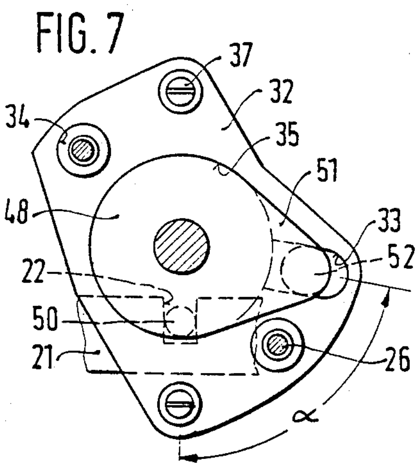
FIG. 7 shows a top view in the direction of arrow VII in FIG. 6.

FIGS. 6 and 7 show, among other things, a pump dummy 48 which is inserted in the pump installation bore 23 and serves for the adjustment of the adjusting plate 32. The pump dummy 48 comprises a dummy body 49 which corresponds at least to a portion of the pump housing 12 and which is inserted in the pump installation bore 23 and, in addition to a stationary coupling part 50 which corresponds to the coupling part 20 of the feed quantity adjusting element 19, carries a positioning peg 52 at a flangelike projection 51, which positioning peg 52 corresponds in position and dimensioning to the positioning peg 28. The stationary coupling part 50 and the positioning peg 52 are at a fixed angular distance from one another, which angular distance is assigned to the basic testing position of the control rod 21 of the engine and is characterized by angle $\alpha$.

The method, according to the invention, for mounting the plug-in pumps 11 on the correspondingly constructed internal combustion engine is described in the following particularly with the help of FIGS. 3 to 7 of the drawing and comprises the following method steps in accordance with the first embodiment:

(a) Prior to the mounting of the plug-in pump 11 a close tolerance extent of projection UT (see FIGS. 1 and 3) is set from the fastening flange 24 to the outermost limit 41 of the plug-in pump 11 on the drive side in order to adjust the pre-stroke VH which determines when the feed begins. The extent of projection UT, which is the same for all pumps of the same series, is adjusted by means of installing or exchaning a structural component part, e.g, the spring disk 38' in FIG. 3*a* or the pre-stroke plate 39 in FIG. 1, which is provided for this purpose and which is made available with a suitable thickness dimensioning e;

(b) also, prior to the installation of the plug-in pump 11, the same extent of projection UT is set at the pump installation bore 23 of the internal combustion engine (see FIG. 5) as a degree of depth, including the adjusting plate 32 and the support surface 47 at the cam drive 43, by means of selecting the adjusting plate 32 which is made available with suitable thickness dimensioning c;

(c) in order to adjust the feed rate and the position of the first adjusting means of the adjusting arrangement 27, the plug-in pump 11 is inserted in the test base 44 and the coupling part 20 of the feed quantity adjusting element 19 is held in the basic testing position, or in a testing position which diverges from the basic testing position by a predetermined amount of distance, by the adjusting rod 46 of the test base 44 at the test bench; the positoning peg 28 serving as the first adjusting means is received by in the recess 45 of the test base 44;

(d) in a test bench which is driven at a fixed rate of rotation, the feed rate of the plug-in pump 11 is measured and the latter is rotated until the feed rate corresponds to a desired feed rate, wherein the adjusting pin 29 provided with the eccentric positioning peg 28 is used as the adjusting tool;

(e) the adjusted rotational position of the plug-in pump 11 assigned to the desired feed rate is fixed at the plug-in pump 11 in that the adjusting pin 29 is secured in the position which it occupies after the adjustment of the feed rate, i.e. the fastening nut 30 is tightened and the sealing cap 31 is pressed in;

(f) for the purpose of the preliminary preparation for mounting the plug-in pump on the pump installation bore 23 of the internal combustion engine (see FIGS. 6 and 7), the control rod 21 of the engine is put into the basic testing position and is blocked in this position; a pump dummy 48 is then inserted through the central opening 35 of the adjusting plate 32 into the pump installation bore 23 and introduced into the counter-coupling part 22 of the control rod 21 with its stationary coupling part 50; when the screws 37 are loosened the adjusting plate 32 is rotated into a position such that its positioning groove 33, which serves as the second adjusting means, receives the positioning peg 52 of the pump dummy 48; the positioning peg 52 and the coupling part 50 are now at the fixed angular distance which is characterized by angle $\alpha$ and which is also the basis of the adjustment of the positioning peg 28 at the plug-in pump serving as the first adjusting means; in this position the adjusting plate 32 is fixed by means of tightening the screws 37 at the pump installation bore 23 and the pump dummy 48 is then removed again;

(g) now the plug-in pump 11 is inserted in the pump installation bore 23 and the feed quantity adjusting element 19 is coupled with the control rod 21 of the engine in that the coupling part 20 is introduced into the counter-coupling part 22 (see FIG. 1), the positioning peg 28 is simultaneously made to overlap with the positioning groove 33 of the adjusting plate 32 and introduced into this groove; in this installation position the plug-in pump 11 is fastened on the internal combustion engine by means of the fastening screws 26;

(h) a limiting stop for the control rod 21 is adjusted to a full load position corresponding or assigned to the testing position, and the blocking of the control rod 21 of the engine is discontinued again.

The method described above can be automated to a great extent, and the mounting of the plug-in pumps can be carried out by means of robots, for example, since the aligning work to be carried out manually by a skilled worker is no longer necessary.

Figure 8:
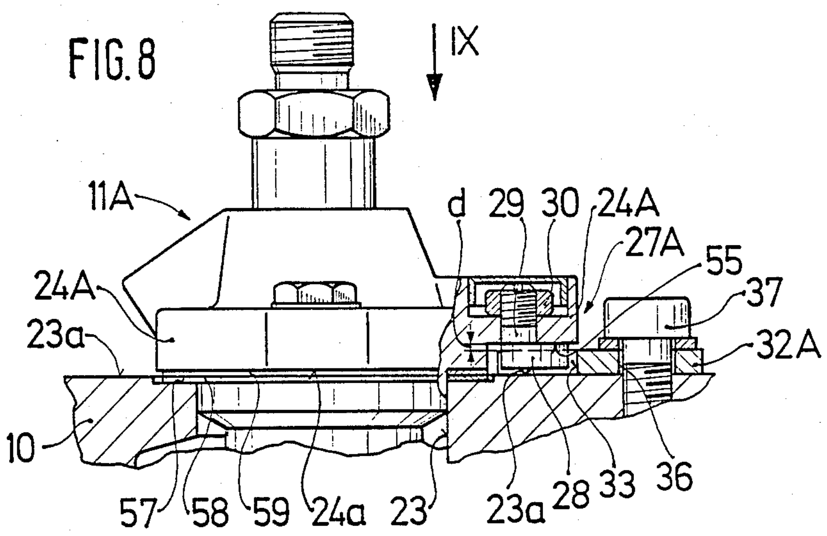
FIG. 8 shows the second embodiment with an adjusting plate which projects into a cut out portion at the fastening flange of the plug-in pump, partly in taken along line VIII in FIG. 9.
Figure 9:
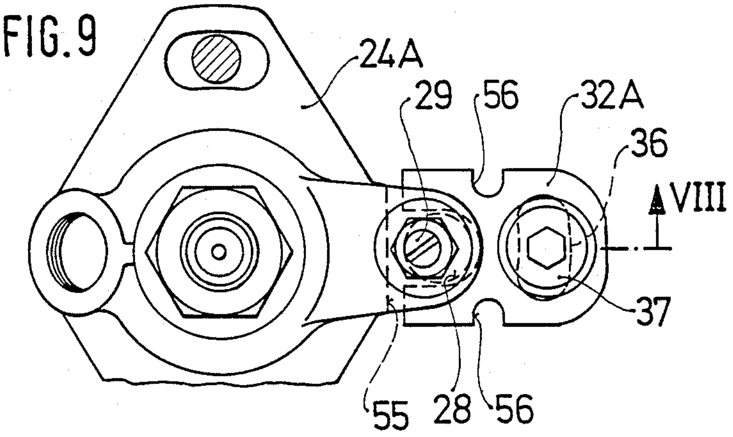
FIG. 9 shows a top view in the direction of arrow IX in FIG. 8.

The second embodiment, shown in FIGS. 8 and 9, for carrying out the method according to the invention, differs substantially only in that the adjusting arrangement 27A is constructed differently. Therefore, identical parts are designated by the same reference numbers, parts that are different have the letter A added to their reference numbers and new parts are provided with new reference numbers.

The adjusting pin 29 is displaceably supported in a portion of the fastening flange 24A of the plug-in pump 11A which projects out laterally in the second embodiment shown and is provided on the front side with the positioning peg 28 forming the first adjusting means, as in the first embodiment example. Unlike the first embodiment, this positioning peg 28 does not project out over a support surface 24*a* of the fastening flange 24A on the drive side but, rather, lies within a cut out portion 55 which is offset parallel to the support surface 24*a* of the fastening flange 24*a* and opens radially outwardly. The adjusting plate 32A, which has the approximate form of a small U-shaped plate, projects into this cut out portion 55. In the shown mounting position with the positioning groove 33 forming the second adjusting means, the adjusting plate 32A embraces the positioning peg 28 on two oppositely located sides and is fastened on the flange surface 23*a* of the pump installation bore 23 on the housing 10 of the internal combustion engine by means of a screw 37.

In addition to the positioning groove 33, which is open toward the plug-in pump 11A, and a through opening 36 for the screw 37, which is used for fastening, the U-shaped adjusting plate 32A is also provided with means for aligning the mounting position of the adjusting plate 32A. This aligning means is formed by two recesses 56 which are arranged on the two sides of the positioning groove 33, as seen from the center of the pump, so as to be offset in an outward direction and symmetrical with respect to the positioning groove 33. These recesses 56 serve to receive the position securing pins on the pump dummy, which is not shown but is mounted in a manner similar to the pump dummy 48 in FIGS. 6 and 7. In addition to the positioning peg 52, this pump dummy also carries two position securing pins, which correspond in position to the recesses 56, at a radially outwardly lengthened portion of the projection 51 in order for the adjusting plate 32A to be aligned radially with respect to the longitudinal axis of the plug-in pump 11A in every mounting position determined by means of the testing position of the control rod 21 (see FIG. 7) or the testing position of a corresponding control element.

A sealing disk 58 and one or more pre-stroke adjusting disks 59, whose total thickness was determined beforehand in correspondence with the dimensioning c in FIG. 5 in the corresponding aforedescribed method step b, are inserted between the flange surface 23A or, as is shown, between a spot facing 57 in the area of the flange surface 23A and the support surface 24*a* of the fastening flange 24A. The thickness of these disks 58, 59 and the adjusting plate 32A, as well as the height of the positioning peg 28, are adapted to one another in such a way that there is always play between the adjusting plate 32A and the recess 56, as well as between the front face of the positioning peg 28 and the flange surface 23A, the play being designated by d in FIG. 8.

The method for mounting the plug-in pump 11A on the correspondingly constructed internal combustion engine, which method is carried out with the use of the adjusting arrangement 27A described with reference to FIGS. 8 and 9, differs only slightly in some method steps from the method described for the first embodiment. Thus, in the method step b, as already mentioned, the depth dimensioning corresponding to the extent of projection UT is set by means of selecting the pre-stroke adjusting disk 59 which is made available in the required quantity or with suitable thickness dimensioning; method steps a, c, d and e are adopted without modification; instead of the adjusting plate 32, which covers the entire flange surface, the small U-shaped adjusting plate 32A is put into the corresponding position in method step f by means of the pump dummy and is fastened with screw 37; method steps g and h, in turn, are not different.

The plug-in pumps 11 and 11A which are mounted according to the method modifications described above generally do not need to be check with respect to their full load position after being mounted; the output adjustment of the internal combustion engine and the checking of the output also become unnecessary when using the method according to the invention, or one need only briefly check the functioning. Accordingly, in multiple-cylinder internal combustion engines the otherwise very costly coordination of the individual pump elements is also dispensed with and the control rod of the engine can be constructed in one piece with the counter-coupling parts for the feed quantity adjusting elements of the plug-in pumps, which counter-coupling parts are arranged in the cylinder spacing.

However, the advantages mentioned above are also attainable in single-cylinder internal combustion engines and their control rod or their correspondingly constructed control element (control lever) need no longer be adjusted or corrected with reference to the basic adjustment after the installation of the plug-in pump.

The invention also extends to pump nozzles which are inserted in the cylinder head of an internal combustion engine and are driven by the camshaft belonging to the engine and controlled by means of a control rod which belongs to the engine and is common to all the pump nozzles, because the individual injection pumps which comprise the respective injection nozzles to form a constructional unit are also "plug-in pumps".

It will be understood that each of the elements described above, or two or more together, may also find a useful application in other types of methods of mounting injection pumps on internal combustion engines differing from the types described above.

While the invention has been illustrated and described as embodied in a method of mounting an injection pump on an internal cmbustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a method for mounting at least one single-cylinder plug-in fuel injection pump on an internal combustion engine, which is controlled by a beveled edge and provided with a fastening flange at a pump housing, and is adjusted before being mounted to the engine to a prestroke, which determines a start of feeding and is set to a respective desired feed quantity on a test bench having a test base with a fixed feed quantity adjusting element in a predetermined basic testing position or in a testing position diverging from said basic testing position by a predetemined distance, by means of rotating said plug-in pump, the method comprising the steps of providing an adjusting arrangement having a first adjusting means and a second adjusting means, and inserting and fastening said plug-in pump in a pump installation bore of said internal combustion engine with the aid of said adjusting arrangement; arranging said first adjusting means before mounting said pump on said test base on a fastening flange of said plug-in pump, and arranging said second adjusting means at a flange surface of said pump installation bore of said internal combustion engine in a position assigned to said basic testing position of said feed quantity adjusting element by means of a pump dummy when a control rod of the engine is blocked in said basic testing position; and positioning said first and second adjusting means so that they overlap when said plug-in pump is inserted in said pump installation bore, the improvement comprising, prior to mounting said plug-in pump (11; 11A), during the rotation of said plug-in pump which is effected for adjusting the feed quantity, holding a positioning peg (28) of an adjusting pin (29) in said test base (44) by means of a recess (45) receiving said positioning peg (28), said adjusting pin (29) being displaceably supported in said fastening flange (24; 24A), said positioning peg (28) being said first adjusting means of said adjusting arrangement (27; 27A) and being directed toward a flange surface (23*a*) at said pump installation bore (23) and, after adjusting the feed quantity, securing said adjusting pin (29) in the position occupied by it; providing an adjusting plate (32, 32A) havaing a positioning groove (33) on said flange surface (23*a*) of said pump installation bore (23), said positioning groove (33) being said second adjusting means and receiving said positioning peg (28), bringing said positioning groove into a position assigned to the basic testing position of said feed quantity adjusting element (19) by means of said pump dummy (48), which is inserted in said pump installation bore (23); providing a coupling part (5) which is fixed in position, and introducing said coupling part (50) into a corresponding countercoupling part (22) of the control rod (21) of the engine, and fixing said coupling part in an introduced position by means of detachably fastening said adjusting plate (32; 32A) to said flange surface (23*a*); and coupling said feed quantity adjusting element (19) with said control rod (21) of the engine when said plug-in pumps is inserted in said pump installation bore (23) and said positioning peg (28) is inserted in said positioning groove (33) of said adjusting plate (32; 32A).

2. Method according to claim 1, wherein said adjusting pin (29) is formed as an overhung crank with an eccentrically arranged positioning peg (28), said adjusting pin being used as an adjusting tool for rotating said plug-in pump during the adjustment of the desired feed quantity.

3. Method according to claim 2, wherein said adjusting plate (32) said positioning groove (33) for receiving said positioning peg (28), which projects forward on the drive side, is fastened on said flange surface (23*a*) of said pump installation bore (23) and serves as a support for said fastening flange (24) of said plug-in pump (11) when said second adjusting means is applied.

4. Method according to claim 1, wherein said adjusting plate (32) for receiving said positioning peg (28), which projects forward on a drive side, is fastened on said flange surface (23*a*) of said pump installation bore (23) and serves as a support for said fastening flange (24) of said plug-in pump (11) when said second adjusting means is applied.

5. Method according to claim 4, comprising the steps of adjusting a close tolerance extent of projection (UT) from said fastening flange (24), which is the same for all pumps of the same series, to an outermost limit (41) of said plug-in pump (11) on the drive side prior to mounting said plug-in pump (11) by mounting or exchanging at least a spring disk (38') and a pre-stroke plate (39) and having a suitable thickness dimensioning (e) in order to adjust a pre-stroke (VH) which determines when the feed begins; and adjusting at said pump installation bore said extent of projection (UT) by means of selecting said adjusting plate (32) which is provided with suitable thickness dimensioning (c).

6. Multiple-cylinder internal combustion engine in combination with plug-in pumps wherein feed quantity adjusting elements are provided, the engine including a control rod constructed so as to form one piece with counter-coupling parts for feed quantity adjusting elements of said plug-in pumps arranged in a single row, said counter-coupling parts being arranged in a cylinder spacing, the combination comprising a plurality of adjusting arrangements for mounting said plug-in pumps, said adjusting arrangements each being formed by two adjusting means, said adjusting means including an adjusting pin (29) supported in a fastening flange (24) of each said plug-in pump (11) so as to be displaceable, and provided with a positioning peg (28) which forms a first adjusting means; and a rotatable adjusting plate (32) having a positioning groove (33) and inserted between said fastening flange (24) of said plug-in pump (11) and a flange surface (23*a*) at a pump installation bore (23) of said internal combustion engine, said positioning groove (33) forming a second adjusting means, said adjusting plate (32) embracing said positioning peg (28) at two sides with said positioning groove (33) forming said second adjusting aid, said adjusting plate having through openings (34) for fastening screws (26) of saaid plug-in pump (11) and a central opening (35) for receiving a pump housing (12), said plate further having at least one through opening (36) for a screw (37) for securing said adjusting plate (32) in position, wherein a dimensioning of said through openings (34, 36) is designed for a limited rotation of said adjusting plate (32).

7. Multiple-cylinder internal combustion engine in combination with plug-in pumps having feed quantity adjusting elements, said engine including a control rod constructed so as to form one piece with counter-coupling parts for said feed quantity adjusting elements of the plug-in pumps which are arranged in a single row, the combination comprising a plurality of adjusting arrangements for mounting said plug-in pumps, said adjusting arrangements each being formed by two adjusting means which include an adjusting pin (29) supported in a fastening flange (24A) of each said plug-in pump (11A) so as to be displaceable and provided with a positioning peg (28) which forms a first adjusting means; said positioning peg (28) being applied within a cut out portion (55), which is offset relative to and parallel to a support surface (24*a*) of said fastening flange (24A) and is open outwardly in a radial direction; and an U-shaped adjusting plate (32A) which projects into said cut out portion (55) from outside, said adjusting plate having a positioning groove (33) which forms a second adjusting means and embraces said positioning peg (28) at two sides and is fastened on said flange surface (23*a*) of a pump installation bore (23) by means of at least one screw (37).

8. The combination according to claim 7, wherein said U-shaped adjusting plate (32A) is provided with means for aligning a mounting position of said adjusting plate (32A), and at least one through opening (36) for said at least one screw.

9. The combination according to claim 8, wherein said means for aligning said adjusting plate (32A) is formed by two recesses (56) which are formed at two sides of said positioning groove (33), so as to be symmetrical with the latter, and which serve to receive position securing pins of a pump dummy.

10. Single-cylinder internal combustion engine in combination with a plug-in pump having a feed quantity adjusting element, said engine including a control rod constructed so as to form one piece with a counter-coupling part for said feed quantity adjusting element of said plug-in pump, the combination comprising an adjusting arrangement for mounting said plug-in pump, said adjusting arrangement being formed by two adjusting means including an adjusting pin (29) supported in a fastening flange (24A) of said plug-in pump (11A) so as to be displaceable and provided on a front side with a positioning peg (28), which forms a first adjusting means; said positioning peg (28) being applied within a cut out portion (55) which is offset relative to and parallel to a support surface (24*a*) of said fastening flange (24A) and is open outwardly in a radial direction; and an U-shaped adjusting plate (32A) which projects into said cut out portion (55) from outside, said plate having a positioning groove (33), which forms a second adjusting means and embraces said postioning peg (28) at two sides and is fastened on a flange surface (23*a*) of a pump installation bore (23) by means of at least one screw (37).

11. The combination according to claim 6 wherein said U-shaped adjusting plate (32A) is provided with means for aligning a mounting position of said adjusting plate (32A), and at least one through opening (36) for said at least one screw (37).

* * * * *